United States Patent
Montero et al.

(10) Patent No.: US 9,619,979 B1
(45) Date of Patent: Apr. 11, 2017

(54) VISUAL INDICATION OF CABLE CONNECTION STATUS

(71) Applicant: Dell Products, L.P., Round Rock, TX (US)

(72) Inventors: Adolfo S. Montero, Pflugerville, TX (US); Marcin M. Nowak, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 15/014,159

(22) Filed: Feb. 3, 2016

(51) Int. Cl.
  *G08B 21/00* (2006.01)
  *G08B 5/36* (2006.01)

(52) U.S. Cl.
  CPC ..................... *G08B 5/36* (2013.01)

(58) Field of Classification Search
  CPC ............ H02J 7/0047; G08B 5/36; G08B 5/38
  USPC ......................................................... 340/635
  See application file for complete search history.

(56) References Cited

U.S. PATENT DOCUMENTS

| | | | | |
|---|---|---|---|---|
| 7,019,658 | B1 * | 3/2006 | Erickson | H01R 13/641 340/635 |
| 2009/0109050 | A1 * | 4/2009 | Sullivan | H04L 12/2602 340/691.1 |
| 2012/0212349 | A1 * | 8/2012 | Chang | H01R 13/6691 340/654 |
| 2013/0076521 | A1 * | 3/2013 | Hsu | H02J 7/0047 340/664 |
| 2014/0210631 | A1 * | 7/2014 | Zavis | G01R 5/28 340/815.45 |
| 2015/0377947 | A1 * | 12/2015 | Hai | G01R 19/2506 324/750.01 |
| 2016/0055725 | A1 * | 2/2016 | Kreiner | G01R 19/165 340/657 |

\* cited by examiner

*Primary Examiner* — Mark Rushing
(74) *Attorney, Agent, or Firm* — Fogarty LLP

(57) ABSTRACT

Systems and methods for providing a visual indication of cable connection status. A method may include determining whether an Information Handling System (IHS) has established data communications using one of a plurality of different types of protocols supported by a cable and providing, on the cable, a visual indication of the type of protocol being used and/or an amount of power delivered via the cable. A cable may include a plurality of conductors, a controller coupled to the plurality of conductors, and a plurality of LEDs coupled to the controller. The controller may: determine whether an IHS coupled to the cable has established data communication with another device via the cable using one of a plurality of different types of protocols supported by the cable; and provide a visual indication of the type of protocol being used in the data communication and/or power delivered via the cable.

19 Claims, 3 Drawing Sheets

VISUAL INDICATION OF CABLE CONNECTION STATUS

FIELD

This disclosure relates generally to Information Handling Systems (IHSs), and more specifically, to systems and methods for providing a visual indication of cable connection status.

BACKGROUND

As the value and use of information continues to increase, individuals and businesses seek additional ways to process and store information. An option is an Information Handling System (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

There are various different types of ports, cables, and connectors available for connecting an IHS to other systems, devices, accessories, or peripherals (e.g., input devices, monitors, external hard drives, printers, etc.). Many of these ports, cables, and connectors follow the Universal Serial Bus (USB) standard.

SUMMARY

Embodiments of systems and methods for providing a visual indication of cable connection status are described herein. In an illustrative, non-limiting embodiment, a method may include determining whether an Information Handling System (IHS) has established data communications using one of a plurality of different types of protocols supported by a cable and providing, on the cable, a visual indication of the type of protocol being used in the data communications.

For example, the cable may include a Universal Serial Bus (USB) Type-C cable. The different types of protocols may include Thunderbolt, Display Port, and USB. And the data communications may be determined to be performed between the IHS and a docking station.

In some embodiments, determining whether the IHS has established data communications may include determining, by a controller within the cable, that the data communications have been successfully negotiated with the IHS. The cable may include a light-emitting diode (LED) corresponding to each of the different types of protocol, and providing the visual indication may include lighting up an LED corresponding to the type of protocol used in the data communications.

Additionally or alternatively, the method may include providing, on the cable, a visual indication of a speed of the data communications. For example, the method may include causing the LED to blink at different rates corresponding to the speed.

Additionally or alternatively, the method may include providing, on the cable, a visual indication of an amount of electrical power being delivered via the cable. For example, the method may include causing the LED to blink at different rates corresponding to the amount of electrical power.

Additionally or alternatively, the method may include causing the LED corresponding to the type of protocol being used in the data communications to have a level of brightness corresponding to an amount of electrical power being provided via the cable or to a speed of the data communications.

In embodiments where a connection has established multiple data links using different protocols, the method may further include determining whether the IHS has established different data communications concurrently with the data communications, where each of the different data communications use a different type of protocol supported by the cable; and providing, on the cable and concurrently with the visual indication, another visual indication of the other type of protocol being used in the different data communications.

In another illustrative, non-limiting embodiment, a cable may include a plurality of conductors, a controller coupled to the plurality of conductors, and a plurality of LEDs coupled to the controller, the controller having program instructions stored thereon that, upon execution by the controller, cause the controller to: determine whether an IHS coupled to the cable has established data communication with another device via the cable using one of a plurality of different types of protocols supported by the cable; and provide, using a selected one of the plurality of LEDs, a visual indication of the type of protocol being used in the data communication.

The controller may include a USB Type-C port controller, and the different types of protocols may include different types of protocols including, for example, Thunderbolt, Display Port, and USB. The program instructions may be further executable to cause the controller to determine that the data communication has been successfully negotiated between the IHS and the other device.

Additionally or alternatively, the program instructions may be further executable to cause the controller to provide, via the selected LED, a visual indication of a speed of the data communication or of an amount of electrical power being provided to or from the IHS via the cable. Additionally or alternatively, the program instructions may be further executable to cause the controller to cause the selected LED to blink at a rate corresponding to the speed or the amount of electrical power.

In yet another illustrative, non-limiting embodiment, a controller may be configured to execute program instructions stored in a memory that, upon execution, cause the controller to determine whether an IHS coupled to a first connector of cable has established data communication with another device coupled to a second connector of the cable using one of a plurality of different types of protocols supported by the cable; and provide, using a selected one of a plurality of LEDs disposed on at least one of the first of second connectors, a visual indication of the type of protocol being used in the data communication.

The program instructions may be executable to also cause the controller to provide, via the selected LED, a visual indication of at least one of: (a) a speed of the data communication, or (b) an amount of electrical power being provided to or from the IHS via the cable. The program instructions may be executable to further cause the controller to make the selected LED blink at a rate corresponding to the speed or the amount of electrical power.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Figure 1:
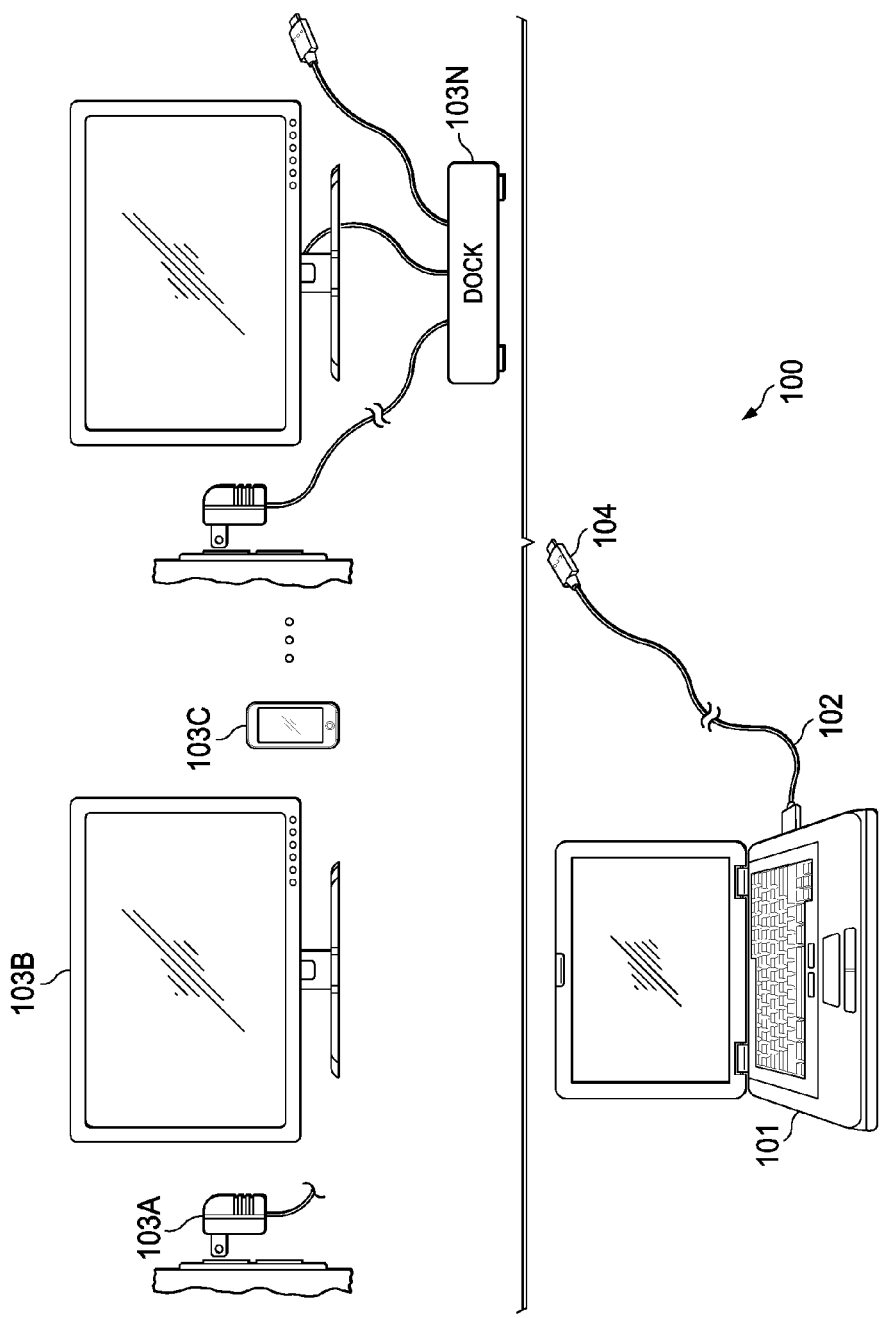
FIG. 1 is a diagram of an environment where a cable configured to provide a visual indication of cable connection status may be used according to some embodiments.

FIG. 1 is a diagram of environment 100 where cable 102—which is configured to provide a visual indication of cable connection status—may be used according to some embodiments. For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

As shown in FIG. 1, IHS 101 is capable of being connected to a wide range of systems, devices, accessories, or peripherals 103A-N (referred to more generally as "device 103"). For example, IHS 101 may be coupled to a power source (e.g., AC utility) via power adaptor 103A. IHS 101 may also be coupled to a variety of input/output devices such as monitors (103B), printers, scanners, modems, external hard drives, access points, routers, tablets and phones (103C), etc. via cable 102. IHS 101 may further be coupled via cable 102 to docking station 103N, which itself is coupled to monitors, ports, devices, etc. More generally, IHS 101 may be coupled via cable 102 to any device designed to operate in environment 100.

Cable 102 may include at least one connector or plug 104 on each (or either) end. In various implementations, connector 104 may be configured to determine whether IHS 101 has established data communications with device 103 using one of a plurality of different types of protocols supported by cable 102. Connector 104 may also provide a visual indication of the type of protocol being used in the data communications.

Cable 102 and connector 104 may follow the Universal Serial Bus (USB) standard, which has a number of different versions and types. For example, in various embodiments, cable 102 and connector 104 follow the USB 3.1 standard and implement the Type-C design.

For sake of background, it should be noted that USB Type-A is the original design for the USB standard with a flat and rectangular shape. On a typical USB cable, the Type A connector is the end that goes into a host, such as IHS 101. And on the host, the USB port (or receptacle) where the Type A-male is plugged into is called an A-female port. Different USB versions including USB 1.1, USB 2.0, and USB 3.0 share the same USB Type-A design.

The Type-B connector is the other end of a standard USB cable that plugs into peripheral device 103, which is known as Type B-male. On the peripheral device, the corresponding USB port is called Type B-female. Because peripheral devices vary a great deal in shape and size, the Type-B connector and its respective port also come in many different designs (Standard-B, Mini-B, Micro-B, etc.).

The newer Type-C port and connector are about the same size as that of the Micro-B USB but both ends of the cable are the same, allowing for reversible and upside down plug orientation on both the host and peripheral sides. Incidentally, most upcoming USB 3.1 products are expected to use the USB Type-C design. Version 3.1 of the USB standard provides a top speed of 10 Gbps and different power profiles that allow larger peripheral devices to draw power from a host IHS.

Figure 2:
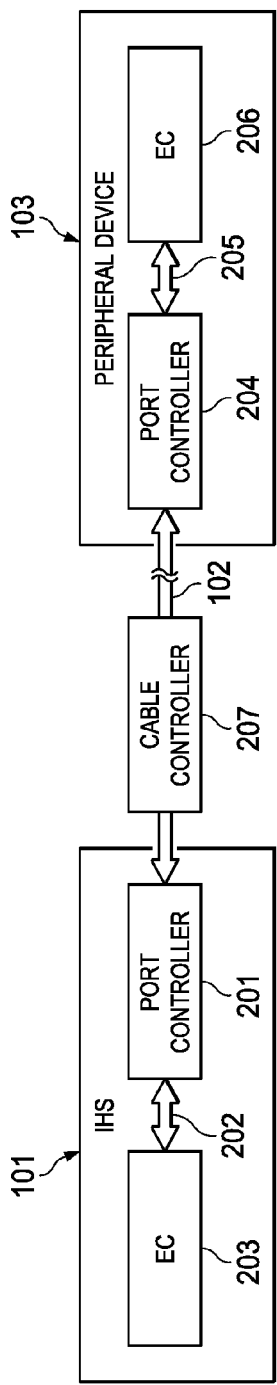
FIG. 2 is a block diagram of an example of a system for providing a visual indication of cable connection status in a Type-C cable according to some embodiments.

FIG. 2 is a block diagram of an example of a system for providing a visual indication of connection status in a Type-C cable according to some embodiments. Specifically, IHS 101 is coupled to device 103 via Type-C cable 102. IHS 101 includes port controller 201 coupled to embedded controller 203 via Inter-Integrated Circuit ($I^2C$) bus 202. Device 103 also includes port controller 204 coupled to embedded controller 206 via Inter-Integrated Circuit ($I^2C$) bus 205.

Type-C cable 102 allows different types of communication protocols to be used, including for example, the Thunderbolt protocol, the Display Port (DP) protocol, and the USB protocol. In some cases, other communication protocols may be used. For example, another video protocol different from DP (e.g., High-Definition Multimedia Interface or "HDMI") may be used. Accordingly, Type-C cable 102 may include dedicated conductor pairs and corresponding terminal for each of these various communication protocols. Additionally or alternatively, Type-C cable 102 may include dynamically reconfigurable terminals or contacts.

For example, in an embodiment, connector 104 may have four contacts with two contacts dedicated for receiving data and two contacts dedicated to transmitting data. As such, cable 102 may support a variety of data types such as HDMI, VGA, component video, digital and/or analog audio, and other audio/video related signals. Some or all of these various signals may be communicated between IHS 101 and accessory 103 using cable 102.

Data is serialized and de-serialized on the host 101 side and/or the accessory 103 side and transmitted at a very high rate (e.g., 10-15 Gbits/sec) over transmit contacts (e.g., a first differential pair) and received via the receive contacts (e.g., a second differential pair). In some embodiments, IHS 101 and accessory 103 can transmit/receive, audio, video and other data including, for instance, control data, accessory identification data, host identification data, or any other non-audio or non-video data to each other.

Port controllers 201 and 204 on the IHS 101 side and the accessory 103 side, respectively, make the communication possible. For example, when IHS 103 wants to send HDMI and audio related signals to monitor 103B, it takes these signals and converts them into a serial stream and communicates that to monitor 103B. At the other end, port controller 204 receives this serial communication and analyzes the stream to determine the type of signals being received. Once the type of signals are known, port controller 204 routes the signals to embedded controller 206 within device 103.

Cable 102 further includes its own controller 207 (e.g., disposed within connector or plug 104). Cable controller 207 may include a memory having instructions stored thereon that, upon execution, enable cable 102 to intercept or sample, in many cases non-intrusively, signals transmitted between port controller 201 of IHS 101 and port controller 204 of device 103. As such, controller 207 may detect the presence of an ongoing communication between IHS 101 and device 103 (e.g., successful completion of a handshake process), to identify the type of protocol being used, and to provide a visual indication to a user of that protocol—as well as other aspects of the communication (e.g., power, speed, etc.).

Figure 3:
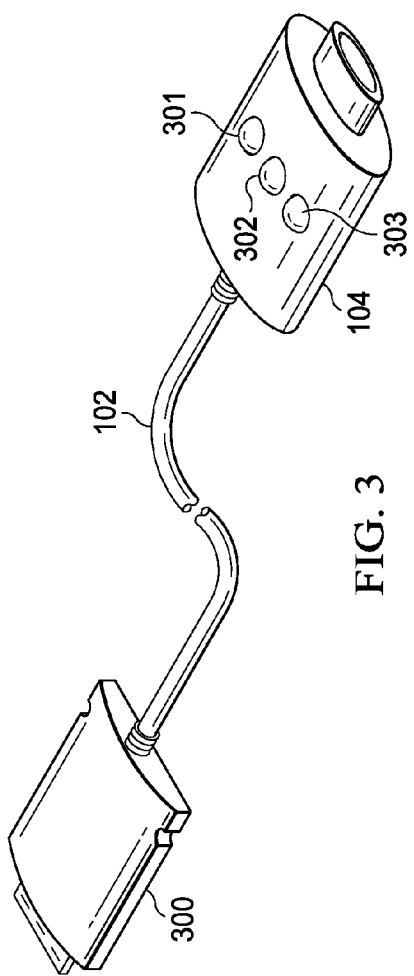
FIG. 3 is a diagram of an example of a cable connector with visual indicators built therein according to some embodiments.

FIG. 3 is a diagram of an example of a cable connector with visual indicators built therein according to some embodiments. Cable 102 includes connector 104—in this case, a male connector or plug that connects to IHS 101—and connector 300—in this case, a custom dock connector that connects to docking station 103. Connector 104, which may internally house controller 207, also includes a plurality of visual indicators 301-303 disposed on its surface. Each visual indicator may be a light source such as, for example, a light-emitting diode (LED).

In various implementations, each of LEDs 301-303 may be of a different color (e.g., red, blue, and green). Accordingly, each color may represent a different communication protocol or mode of operation. For instance, "red" may represent a Thunderbolt mode of operation or protocol, "blue" may represent a Display Port mode of operation or protocol, and "green" may represent a USB mode of operation of protocol. Each light may be activated depending upon the type of communication detected by controller 207. In some cases, more than one protocol may be used at the same time; therefore more than one of LEDs 301-303 may be lit concurrently or simultaneously.

In various embodiments, LEDs 301-303 may be further used to indicate additional information regarding the communication. For example, IHS 101 may be capable of providing power to accessory 103 (and vice-versa) via cable 102 in one of a plurality of modes or profiles as shown in Table I:

TABLE I

| Power Profile | Voltage | Current | Data |
| --- | --- | --- | --- |
| 1 | 5 V | 1.5 A | none |
| 2 | 12 V | 3.0 A | USB 2.0 |
| 3 | 20 V | 5.0 A | USB 3.x; Display Port; and/or Thunderbolt. |

Therefore, in addition to the type of protocol, any of LEDs 301-303 may also indicate which power mode is being used, for example, by blinking in one of three distinct frequencies; for instance at 10 Hz for the first power profile, at 60 Hz for the second power profile, and all the time (constantly lit) for the third power profile. In many cases, the amount of power indicated is less than the total amount of power otherwise available from the source.

For instance, the green LED may be turned on when cable 102 detects a USB connection between IHS 101 and device 103, and that same LED may blink at 60 Hz (or any other selected frequency) to indicate that the USB connection is drawing power under the second profile shown in Table I. If the third power profile is used (up to 100 W), then the green LED may be turned on constantly and without blinking for as long as the connection is maintained.

Additionally or alternatively, any of LEDs 301-303 may indicate which a speed of the connection between IHS 101 and device 103, again, by blinking in a different frequency. When the power profile is not being indicated, the frequency at which the LED blinks may be proportional to the connection speed. In embodiments where both the power profile and connection speed are both being indicated by the same LED, however, more complex blinking patterns may be used.

For instance, blinking may occur in a combination of two or more frequencies, a first one indicating the power profile and a second one indicating a data rate. Returning to the same example, the green LED may be turned on when cable 102 detects a USB connection, and cable 102 may cause that same LED to blink at a first frequency to indicate that the USB connection is drawing power under the second profile. Moreover, the green LED may also blink at a second frequency to indicate that the USB connection is being effected at a given one of a plurality of data rates.

The two blinking frequencies, when combined, create a visual pattern that is readily identifiable to a human user. For example, the green LED may blink once every second to indicate the second power profile being used, and after every n blinks the LED may flash repeatedly a number of times in sequence, such that either n or the number of times (or both) may indicate the speed of the connection. Additionally or alternatively, the green LED may blink once every second to indicate the second power profile being used, and may stay on for a selected time duration after every n blinks such that the time duration may indicate the speed of the connection.

Additionally or alternatively, embodiments may use blink rates for identifying a data rate or speed, and different LED brightness levels for identifying power levels, thus mixing blinking with intensity control to visually encode any of the aforementioned information.

Additionally or alternatively, the blinking of LEDs 301-303 may visually encode or modulate information which may then be automatically decoded using another IHS equipped with a video camera. For example, Morse code or other digital encoding schemes (light=1 and dark=0) may be used. As such, in these implementations, more complex information may be visually conveyed that the naked human eye is capable to assess.

Figure 4:
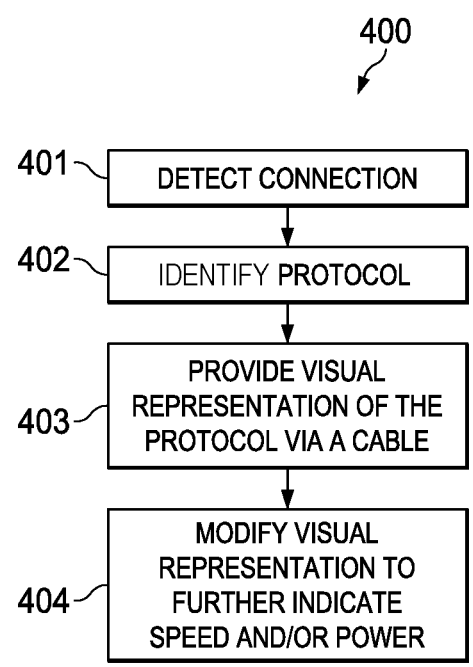
FIG. 4 is a flowchart of a method for providing a visual indication of cable connection status according to some embodiments.

FIG. 4 is a flowchart of a method for providing a visual indication of connection status. In various embodiments, method 400 may be performed, at least in part, by controller 207 within cable 102. In other embodiments, method 400 may be performed in a docking station or peripheral device's embedded controller, which aggregates information. In some cases, an embedded controller in the dock may have a direct connection to cable controller 207 through out-of-band protocol so that it can drive LED(s) indirectly.

At block 401, method 400 includes detecting a connection between IHS 101 and device 103. At block 402, method 400 includes identifying a communication protocol being used in the communication (e.g., Thunderbolt, DP, and/or USB), for example, by monitoring a handshake event or control messages exchanged between IHS 101 and device 103.

At block 403, method 400 may include providing a visual representation of the protocol being used via cable 102. As discussed above, cable 102 may include connector 104 having a plurality of LEDs 301-303 disposed thereon. Each LED may be independently controlled to indicate the protocol being used. In some cases, more than one protocol may be used concurrently; therefore more than one LED may be activated at once.

At block 404, method 400 includes modifying the visual representation to further indicate additional communication parameters, such as, for example, the power profile of the communication or the speed or data rate of the communication. Again, the same light(s) activated due to a given protocol being detected may be caused to blink in different ways and/or with different intensities to also indicate the power profile and/or speed.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A method, comprising:
    determining whether an Information Handling System (IHS) has established data communications using one of a plurality of different types of protocols supported by a cable;
    providing, on the cable, a visual indication of the type of protocol being used in the data communications;
    determining whether the IHS has established different data communications concurrently with the data communications, wherein the different data communications use a different type of protocol supported by the cable; and
    providing, on the cable and concurrently with the visual indication, another visual indication of the different type of protocol.

2. The method of claim 1, wherein the cable includes a Universal Serial Bus (USB) Type-C cable, and wherein the different types of protocols include Thunderbolt, Display Port, and USB.

3. The method of claim 1, wherein the data communications is determined to be performed between the IHS and a docking station.

4. The method of claim 1, wherein determining whether the IHS has established data communications includes determining, by a controller within the cable, that the data communications have been successfully negotiated with the IHS.

5. The method of claim 1, wherein the cable includes a light-emitting diode (LED) corresponding to each of the different types of protocol, and wherein providing the visual indication includes lighting up an LED corresponding to the type of protocol being used in the data communications.

6. The method of claim 5, further comprising providing, on the cable, a visual indication of a speed of the data communications.

7. The method of claim 6, further comprising causing the LED corresponding to the type of protocol being used in the data communications to blink at different rates corresponding to the speed.

8. The method of claim 5, further comprising providing, on the cable, a visual indication of an amount of electrical power being provided via the cable.

9. The method of claim 8, further comprising causing the LED corresponding to the type of protocol being used in the data communications to blink at different rates corresponding to the amount of electrical power.

10. The method of claim 5, further comprising causing the LED corresponding to the type of protocol being used in the data communications to have a level of brightness corresponding to an amount of electrical power being provided via the cable or to a speed of the data communications.

11. A cable, comprising:
    a plurality of conductors;
    a controller coupled to the plurality of conductors; and a plurality of light-emitting diodes (LEDs) coupled to the controller, the controller having program instructions stored thereon that, upon execution by the controller, cause the controller to:
  determine whether an Information Handling System (IHS) coupled to the cable has established data communication with another device via the cable using one of a plurality of different types of protocols supported by the cable;
  provide, using a selected one of the plurality of LEDs, a visual indication of the type of protocol being used in the data communication;
  determine whether the IHS has established different data communications concurrently with the data communications, wherein the different data communications use a different type of protocol; and
  provide, on the cable and concurrently with the visual indication, another visual indication of the different type of protocol.

12. The cable of claim 11, wherein the controller includes a Universal Serial Bus (USB) Type-C port controller.

13. The cable of claim 11, wherein the different types of protocols include Thunderbolt, Display Port, and Universal Serial Bus (USB).

14. The cable of claim 11, wherein the program instructions are further executable to cause the controller to determine that the data communication has been successfully negotiated between the IHS and the other device.

15. The cable of claim 11, wherein the program instructions are further executable to cause the controller to provide, via the selected LED, a visual indication of a speed of the data communication or of an amount of electrical power being provided to or from the IHS via the cable.

16. The cable of claim 11, wherein the program instructions are further executable to cause the controller to cause the selected LED to blink at a rate corresponding to the speed or the amount of electrical power.

17. A controller configured to execute program instructions stored in a memory that, upon execution, cause the controller to:
  determine whether an Information Handling System (IHS) coupled to a first connector of cable has established data communication with another device coupled to a second connector of the cable using one of a plurality of different types of protocols supported by the cable;
  provide, using a selected one of a plurality of LEDs disposed on at least one of the first of second connectors, a visual indication of the type of protocol being used in the data communication;
  determine whether the IHS has established different data communications concurrently with the data communications, wherein the different data communications use a different type of protocol; and
  provide, on the cable and concurrently with the visual indication, another visual indication of the different type of protocol.

18. The controller of claim 17, wherein the program instructions are further executable to cause the controller to provide, via the selected LED, a visual indication of at least one of: (a) a speed of the data communication, or (b) an amount of electrical power being provided to or from the IHS via the cable.

19. The controller of claim 17, wherein the program instructions are further executable to cause the controller to make the selected LED blink at a rate corresponding to the speed or the amount of electrical power.

* * * * *